UNITED STATES PATENT OFFICE.

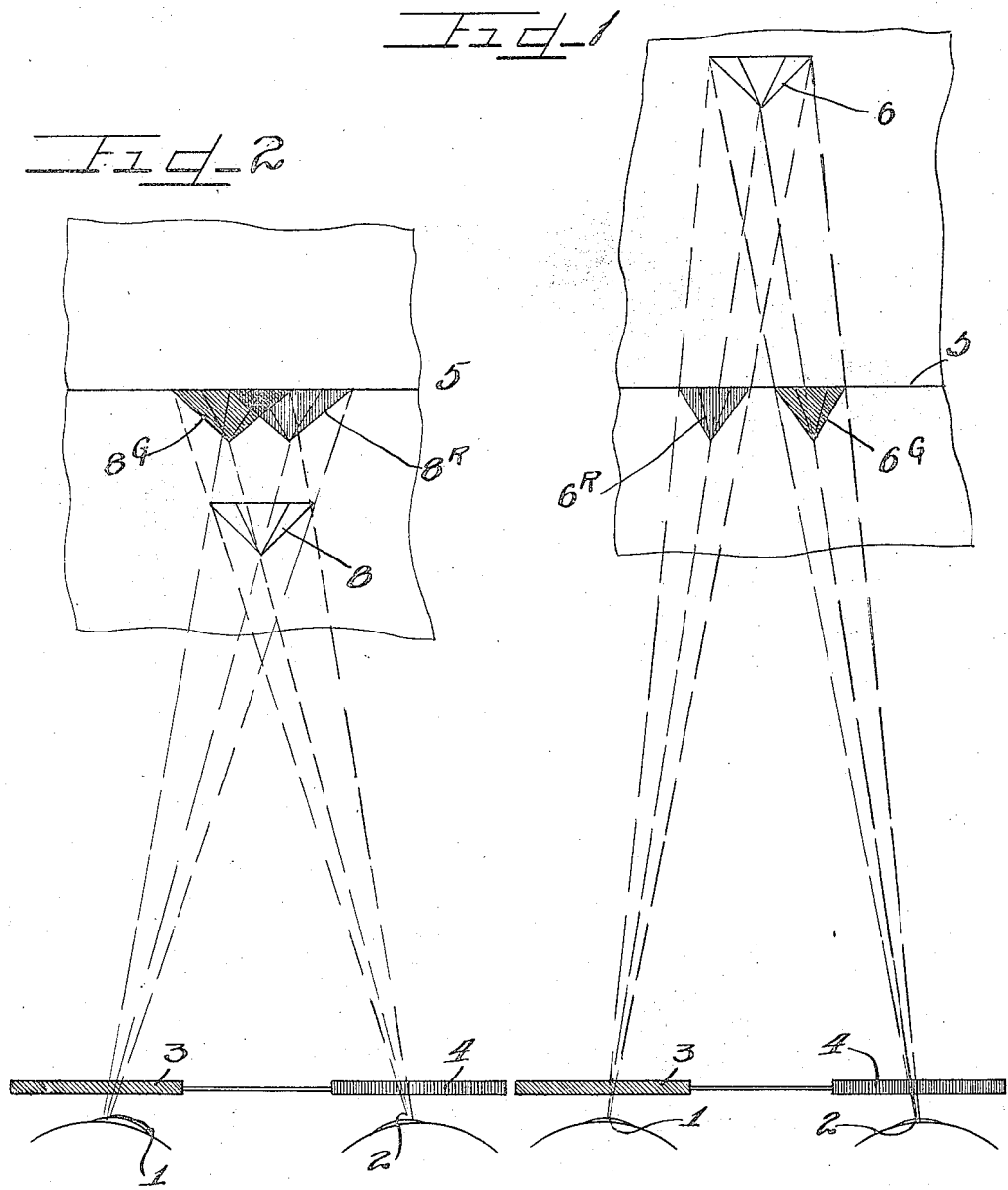

ALFRED J. MACY, OF CHICAGO, ILLINOIS, ASSIGNOR TO MACY ART PROCESS CORPORATION, A CORPORATION OF ILLINOIS.

STEREOSCOPIC PICTURE.

1,386,720.        Specification of Letters Patent.     Patented Aug. 9, 1921.

Application filed May 29, 1919. Serial No. 300,576.

*To all whom it may concern:*

Be it known that I, ALFRED J. MACY, a citizen of the United States, and a resident of the city of Chicago, in the county of Cook and State of Illinois, have invented a certain new and useful Improvement in Stereoscopic Pictures; and I do hereby declare that the following is a full, clear, and exact description of the same, reference being had to the accompanying drawings, and to the numerals of reference marked thereon, which form a part of this specification.

The ordinary stereoscopic picture consisting of a right and left eye view mounted a certain pupillary distance apart and to be viewed through a stereoscope is an old and well known art in photography. It is nevertheless interesting in that a remarkable illusion is produced whereby the observer is given the same impressions of solidity and perspective that actually obtain in the scene itself.

The two color process of making stereoscopic pictures wherein the complementary views of the picture are superposed or impressed on the same surface and then viewed through color screens different in color from one another, but corresponding in color to the respective impressions of the complementary views, is also known to me, but my invention comprehends this idea and goes much further.

One object of my invention is to construct a stereogram which shall cause an object or a portion of an object to appear to be nearer the observer than the surface of the stereogram.

Another object of my invention is to provide a method whereby the portion of the picture which shall seem to project and the amount of its protrusion can be predetermined.

Another object of my invention is to utilize the markings, imperfections, roughness or other visible features of the surface bearing the stereogram to produce in the stereographic image a reference plane which the observer will unconsciously use and thereby obtain the impression that certain parts of the picture are in front of the surface.

It is another object of this invention to provide a method whereby simple directions to the printer independent of any knowledge on his part of the stereographic effects to be secured will suffice to enable him to print the stereogram so that the intended effect is obtained.

Other and further important objects of the invention will be apparent from the description in the specification and disclosures in the accompanying drawings.

The invention is diagrammatically illustrated in the drawings and hereinafter more fully described.

On the drawings:

Figure 1 is a diagram illustrating the principles of this invention applied to an element of a picture which is to appear behind the plane of the stereogram.

Fig. 2 is a similar diagram illustrating the application of these principles to an element of a picture which is to appear in front of the plane of the stereogram.

As shown on the drawings:

The eyes of the observer are represented at 1 and 2. In front of the eyes are a pair of some colored screens 3 and 4. The surface containing the stereogram is represented at 5. This surface is at right angles to the plane of the drawing. For the better illustration of this fact, it has been shown as intersecting a surface in the plane of the drawing. The latter surface is indicated by irregular lines. The straight lines 5 represent the intersection of the surface containing the stereogram with this horizontal surface.

In Fig. 1 there is represented a stereographic picture of a pyramid. For the sake of clearness, the layer of pigment representing this pyramid is rotated out of the plane of the stereogram into the plane of the drawing. It is, however, understood that the pyramid as actually printed or painted in the stereogram is on the surface 5.

As indicated by the hatching the color screen 3 on the left and the printed or painted figure 6G are of the same color. Also the color screen 4 on the right and the printed or painted figure 6R are of the same color. The two colors used are contrasting colors. In practice they are nearly complementary but this is not essential to the practice of the invention. It is sufficient that the color of the stereographic component 6G is such that the rays reflected thereby will go readily through the color screen 3 but will be almost completely stopped by the color screen 4. This will mean that the left eye 1 will not see the figure 6G because it and the background will appear alike. But the right hand eye 2 looking through the color screen 4 will find a contrast between the figure 6G and the background and consequently will see the figure 6G. In the same way the color of the left eye stereographic component 6R is such that it can be readily seen by the left eye 1 but will be almost invisible to the right eye 2.

The lines of vision drawn in the diagram show that the relative position of the two stereographic components 6R and 6G is such that the combined effect of the vision by the two eyes is to see an image of the pyramid at 6 behind the plane 5. It will be obvious from a study of this diagram that to move the left eye stereographic component representation 6R toward the left and the right eye component 6G toward the right is to make the image 6 retreat still farther behind the plane 5. Also to move the right eye component 6G toward the left, and the left eye component 6R toward the right will be to cause the image 6 to move forward.

In Fig. 2 the effect of continuing this motion until the two stereographic component representations have passed one another is illustrated. In this figure the position of the eyes, the color of the screens and of two stereographic components is the same as already explained. It will be observed, however, that the left eye stereographic component 8R is principally to the right of the right eye stereographic component 8G, although portions of the components are shown as overlapping. The lines of vision drawn in this diagram show that the resulting image 8 is in front of the plane 5.

It is therefore evident from the two diagrams and from the principles explained in connection with them that the position of the stereographic image may be altered by changing the right and left relation of the two-color stereographic component representations. If the left eye stereographic component representation of a single point be to the left of the right eye stereographic component representation of that point, the stereographic image of the point will be behind the surface of the stereogram. If the left eye stereographic component representation of a given point be to the right of the right eye stereographic component representation of that point, the image of the point will be in front of the plane 5. These conclusions are readily verified by inspecting the lines of vision as given in the diagram for the apex of the pyramid or for any one corner of its base.

If the two stereographic components of a given point coincide the lines of vision from the two eyes must necessarily cross at this point so that the stereographic image of the point will coincide with the coincident stereographic representations thereof; that is, for a point whose two component stereographic representations coincide, the stereographic image will be in the plane of the stereogram.

As will be seen from the diagram if an element of the picture be considered which is more than a point, certain parts of the component stereographic representations of the element may overlap without the elements coinciding. The mere presence of overlap in the component representations of an element therefor is not enough to bring it into the plane of the stereogram.

Two stereographic component representations of an object or of a collection of objects cannot ordinarily be made to register throughout. The two component representations are made from two points; consequently, the parallax is such that if the near objects are made to coincide, the distant objects will be out of register, or if the distant objects be made to coincide, the near objects will be out of register. It is not possible to make two such stereographic component representations completely register.

These considerations show that only selected objects in the picture can be made to register. In my invention I take advantage of this principle by selecting for those objects which are to register the objects that I desire to appear to be in the surface of the stereogram. This will automatically bring to the front of that surface objects which are in the picture nearer to the observer than the selected objects and will place to the rear of the surface those which in the picture are behind it.

The commonest way of producing a stereogram of this type is to take two photographs from two view points at the required distance apart and produce two lithographic, photo-lithographic or half-tone or other printing plates therefrom. The two component stereographic representations of the picture are then printed from these plates upon one piece of paper. As just explained, it is not possible to make these two impressions upon the paper register throughout; but, if the printer be directed to make the two register for some one element, he will find it entirely possible to follow these directions. It is thus possible, by giving directions to the printer which do not bother him with any remarks about the intended stereographic result, to have him print a stereogram which will cause the intended elements to be in the surface of the stereogram. Then the elements which were expected to will appear to stand out in front of such surface and the elements which were expected to appear to stand behind such surface will do that.

When such a stereogram is viewed through the color screens, any flecks of dust, roughness in paper, pebbling, scratches, marks, border lines, edges of the picture, frame, or other objects in the surface of the stereogram, which do not form a part of the stereographic components of the stereogram, will appear like a pair of coincident stereographic representations of a point because such objects will not be duplicated by objects of the contrasting color in their immediate neighborhood. The observer consequently will unconsciously and involuntarily visualize these objects or rather the combined effect of all such objects as a haze through which he sees the stereographic image beyond the plane of the stereogram. The effect is quite similar to that of looking through a window pane which is not clean; one sees the objects beyond but is entirely conscious of the glass and aware that the objects are beyond the glass. In the same way the observer is conscious of the surface of the stereogram and aware that the image is beyond that surface.

In the case of an image which projects into the space in front of the surface the presence of these flecks of dust or other markings upon the surface tends to emphasize the fact that the image is nearer than those markings. Thus the surface of the paper or other medium upon which the stereogram is produced acts as a reference plane to which the observer unconsciously refers all the objects in the picture placing some behind and others in front of said plane and thereby adding to the effect of relative distance and of solidity which is the characteristic result of a stereogram.

I am aware that various details of this invention may be varied through a wide range without departing from the principles thereof, and I therefore do not purpose limiting the patent granted otherwise than necessitated by the prior art.

I claim as my invention:

1. A stereogram having two stereographic components, a portion of the elements of said components being out of register in one direction and other of said elements being out of register in the opposite direction, whereby certain parts of the stereographic image will be in front of the surface of the stereogram and other parts thereof will be behind said surface.

2. A stereogram consisting of two stereographic components on the same surface in overlapping relation, a portion of the element of said components being out of register in one direction and other of said elements being out of register in the opposite direction, said surface having portions visually distinct from the remainder thereof, whereby when said stereogram is viewed stereographically a portion of the stereographic image will appear to be in front of and other parts behind said surface.

3. A stereogram having two stereographic components, the right eye component having its representations of certain elements to the left of the representations of said elements in the left eye component, whereby rays of light from said representations to their respective eyes will cross in front of the stereogram and the right eye component having its representations of certain other elements to the right of the representations of said elements in the left eye component, whereby rays of light from said representations to their respective eyes would if prolonged cross behind the stereogram.

4. A stereogram having two overlapping stereographic components in different colors, those portions of the stereogram which are intended to show an object in the plane of the stereogram having the stereographic components in register and other portions having them out of register.

In testimony whereof I have hereunto subscribed my name in the presence of two subscribing witnesses.

ALFRED J. MACY.

Witnesses:
 LE ROY D. KILEY,
 CHARLES W. HILLS, Jr.